United States Patent [19]

Nolen, Jr.

[11] Patent Number: 5,145,500
[45] Date of Patent: Sep. 8, 1992

[54] TRIMMABLE RANGE HOOD FILTER

[75] Inventor: Edward F. Nolen, Jr., Memphis, Tenn.

[73] Assignee: Air Kontrol, Inc., Batesville, Miss.

[21] Appl. No.: 874,854

[22] Filed: Apr. 28, 1992

[51] Int. Cl.$^5$ ............................................. B01D 46/10
[52] U.S. Cl. ..................................... 55/501; 55/511;
55/DIG. 31; 55/DIG. 36
[58] Field of Search ...................... 55/385.1, 496, 501,
55/503, 511, DIG. 31, DIG. 36

[56] References Cited

U.S. PATENT DOCUMENTS

| | | | |
|---|---|---|---|
| 3,184,052 | 5/1965 | Gledhill | 55/DIG. 31 X |
| 3,509,696 | 5/1970 | Thompson | 55/501 X |
| 3,577,712 | 5/1971 | Ballennie | 55/501 |
| 3,660,969 | 5/1972 | Fox | 55/385 |
| 4,555,255 | 11/1985 | Kissel | 55/DIG. 31 X |
| 4,840,650 | 6/1989 | Matherne | 55/385.1 |
| 5,059,218 | 10/1991 | Pick | 55/131 |

OTHER PUBLICATIONS

Air Kontrol, Inc., Rangehood Filters (Form AL-K1-300).

Air Kontrol, Inc., At last, a filter that will feel at home on any range.

Primary Examiner—Charles Hart
Attorney, Agent, or Firm—Walker, McKenzie & Walker

[57] ABSTRACT

A trimmable range hood filter for covering both an inlet opening of a range hood and a light on the range hood adjacent the inlet opening. The filter includes a rectangular filter element, four non-telescoping frame members sequentially arranged to form a rectangle, attachment clips joining the frame members at the corners, a translucent plastic pane, and a separator bar with an "S"-shaped cross-section joining an edge of the pane to an edge of the filter element. The pane and filter element, joined by the separator bar, fit within inwardly facing channels of the frame members. The various parts of the range hood filter, i.e., the filter element, the pane, the separator bar, and the frame members, are trimmable by scissors to fit the range hood dimensions, with the filter element covering the inlet opening and the pane covering the mouth of a cavity in which the range hood light sits. The attachment clips fit into channels formed by flanges on the inner sidewalls of the frame members, and have outwardly bent tabs for holding the clips to the frame members.

4 Claims, 1 Drawing Sheet

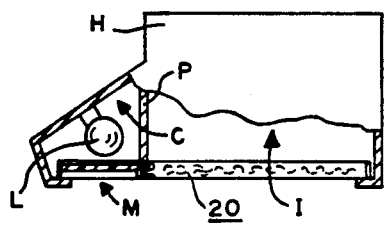
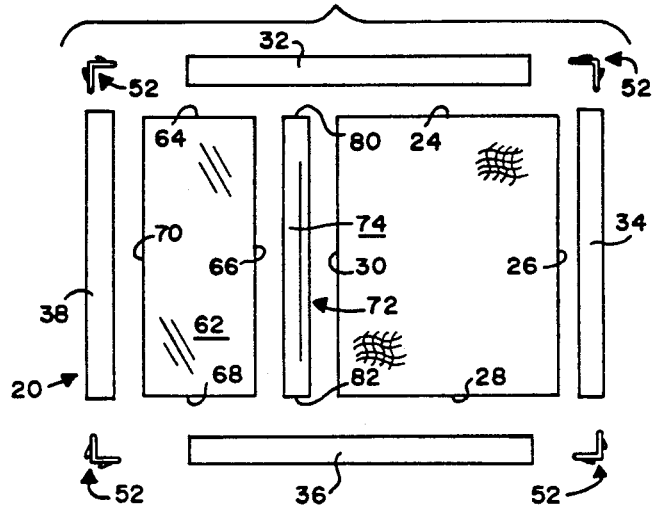
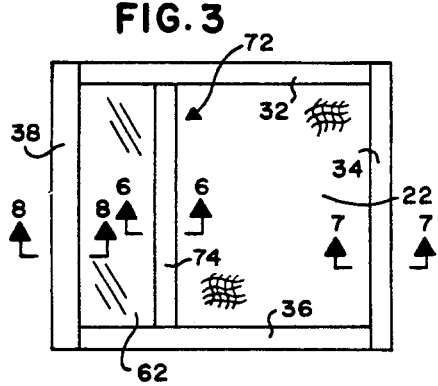
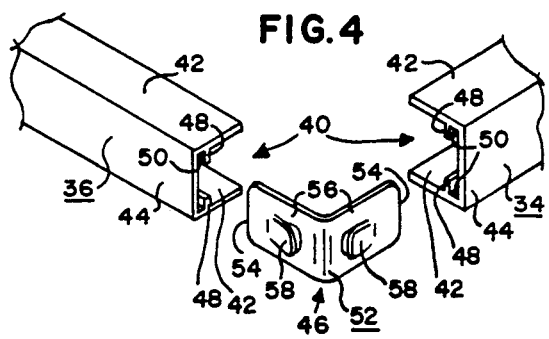
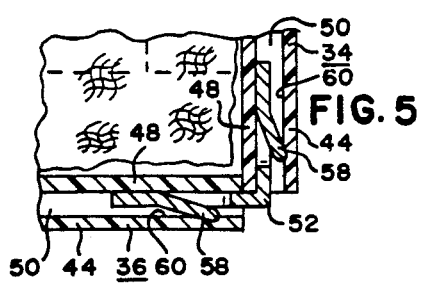
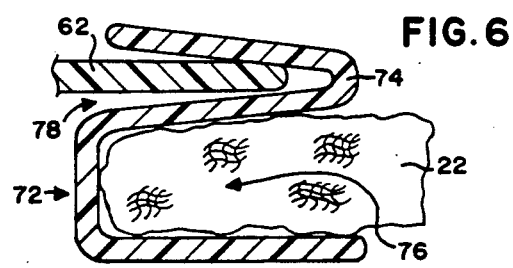
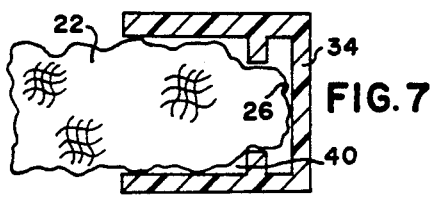
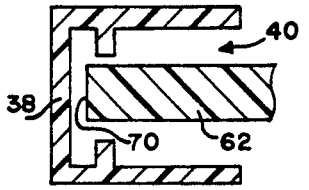

TRIMMABLE RANGE HOOD FILTER

BACKGROUND OF THE INVENTION

1. Field of the Invention

The present invention relates, in general, to replaceable filters for use on cooking range hoods, and in particular, to such filters that cover both an inlet opening on the range hood and a light on the range hood adjacent the inlet opening.

2. Information Disclosure Statement

Ventilating cooking range hoods are well-known to have replaceable filters through which air is drawn to remove, for example, particulates or grease from the air. Many range hoods also have lights attached to the underside thereof adjacent the ventilation inlet opening. To prevent grease or dust from accumulating on the light, range hood manufacturers often provide filter assemblies with a transparent or translucent pane of glass or plastic to cover the light, with said pane being placed within the filter assembly frame that also holds the filter element itself.

Heretofore, such filter assemblies with panes were manufactured to the exact size required for a specific range hood. A supplier of such filters necessarily must stock the multitude of various sizes required, as each filter assembly has its own specialized dimensions for its frame as well as the proportion of the frame occupied by the filter element versus the pane that covers the light. Most suppliers find such a large inventory to be prohibitive, and therefore any replacement filters must then be specially ordered or manufactured when desired.

These specifically manufactured replacement filters with light panes, like the original filters they replace, typically have an extruded aluminum frame, continuous about the circumference of the frame, with notched and bent corners formed therein.

It is therefore desirable to have a single filter kit that is trimmable by the installer to replace the multitude of various specialized filters, each with its own unique dimensions. Not only must the frame and filter elements be trimmable, but also the light pane, which also must match the size of that which it replaces.

Prior filters are known that have telescoping frames, in which opposite sides of the frame telescope to the desired size and into which a trimmable filter element is placed after having been trimmed to the desired size. While such a telescoping-frame filter solves the problem of diverse inventory required for those filters without light panes, it does not address the similar problem existing for filters that must have a specifically dimensioned pane covering the range hood light.

The assignee of the present invention has also marketed, for over one year, a trimmable filter having trimmable frame elements joined by clips at the corners, like the present invention, but with only a trimmable filter element suspended therein. Like the known filters with telescoping frames, such a trimmable filter does not address the problem solved by the present invention of providing a tailorable light pane for a range hood light.

A preliminary patentability search in Class 55, subclass 385.1, Digest 31 and Digest 36, produced the following patents, some of which may be relevant to the present invention: Fox, U.S. Pat. No. 3,660,969, issued May 9, 1972; and Matherne, U.S. Pat. No. 4,840,650, issued June 20, 1989.

Additionally, Pick, U.S. Pat. No. 5,059,218, issued Oct. 22, 1991, describes, at columns 4 and 5 and FIGS. 3A–3C, corner connectors for joining extruded frame members at the corners.

While each of the above patents disclose various hinging apparatus or interlocking hanging systems, none disclose or suggest the present invention. More specifically, none of the above patents disclose or suggest a trimmable range hood filter for covering both an inlet opening of a range hood and a light on said range hood adjacent said inlet opening, said range hood filter comprising: a rectangular filter element selectively trimmed to have compatible dimensions with said inlet opening, said filter element having, in clockwise sequence, a first, a second, a third, and a fourth side; a first, a second, a third, and a fourth non-telescoping frame member sequentially arranged to form a rectangle, wherein each said frame member constitutes a different side of said rectangle, said first and said third frame members being of substantially the same length and being parallel to one another, and said second and said fourth frame members being of substantially the same length and being parallel to one another and perpendicular to said first and said third frame members, each said frame member having a longitudinal channel facing inwardly into said rectangle, with said first, second, and third sides of said filter element respectively being inserted into the longitudinal channels of said first, second, and third frame members but not that of said fourth frame member; four attachment means, one at each corner of said rectangle, for fixedly joining adjacent frame members to form said each corner; a selectively trimmed plastic pane capable of passing illumination from said light therethrough, said pane having, in clockwise sequence, a first, a second, a third, and a fourth side, with said first, third, and fourth sides of said pane respectively being inserted into the longitudinal channels of said first, third, and fourth frame members but not that of said second frame member; and, means for sealingly joining said fourth side of said filter element to said second side of said pane.

Fox, U.S. Pat. No. 3,660,969, describes a latch for attaching a filter and separate light lens to a range hood. Unlike the present invention, the Fox filter and lens are not tailorable and are not both within the same frame.

Matherne, U.S. Pat. No. 4,840,650, describes a filter element that fits within a single channel on a ceiling fan attachment frame.

SUMMARY OF THE INVENTION

The present invention is a trimmable range hood filter for covering both an inlet opening of a range hood and a light on the range hood adjacent the inlet opening. The range hood filter has four trimmable frame members arranged in a rectangle and secured to one another at the corners. A trimmable plastic pane and a trimmable filter element fit within inward-facing longitudinal channels of the rectangular frame, with the pane and the filter element being joined by sealing means such as a trimmable separator bar, itself having opposite-facing longitudinal channels for holding the filter element and the pane. The filter element then covers the range hood's inlet opening, while the pane protects the light from grease or dust. A user of the filter buys a kit of parts, then trims the filter, the frame members, the pane, and the separator bar with scissors to fit the particular dimensions of the range hood.

It is an object of the present invention to provide a trimmable range hood filter that may be tailored to fit the dimensions of a particular lighted range hood. The filter should have both a trimmable filter element for covering an inlet opening of the range hood, a trimmable pane for covering a light on the underside of the range hood, and trimmable sealing means for joining the pane to the filter element within a trimmable frame.

BRIEF DESCRIPTION OF THE DRAWINGS

FIG. 1 is a side sectional view of the present invention inserted within a range hood.

FIG. 2 is an exploded plan view of the present invention showing the various component parts.

FIG. 3 is a assembled plan view of the present invention.

FIG. 4 is a perspective view of a corner of the frame of the present invention, showing the attachment means for joining adjacent frame members at the corner.

FIG. 5 is an enlarged sectional plan view of an assembled corner of the present invention showing the attachment of the adjacent frame members to each other.

FIG. 6 is an enlarged transverse sectional view of the separator bar joining the pane to the filter element, taken along the line 6—6 shown in FIG. 3.

FIG. 7 is an enlarged transverse sectional view of a frame member showing the insertion of the filter element within the longitudinal channel thereof, taken along the line 7—7 shown in FIG. 3.

FIG. 8 is an enlarged transverse sectional view of a frame member showing the insertion of the pane within the longitudinal channel thereof, taken along the line 8—8 shown in FIG. 3.

DESCRIPTION OF THE PREFERRED EMBODIMENT

Referring to FIG. 1, the trimmable range hood filter 20 of the present invention is shown attached under a range hood H. Range hood H has an inlet opening I and an adjacent light L, and will be understood to have particular dimensions of opening I and downward-facing mouth M of cavity C within which light L is attached, with plate P separating cavity C from opening I.

Referring to FIGS. 2 and 3, range hood filter 20 is seen to comprise a rectangular filter element 22 selectively trimmed, as with scissors, to have compatible dimensions with inlet opening I. Filter element 22 is seen to have, in clockwise sequence, a first side 24, a second side 26, a third side 28, and a fourth side 30. Filter element 22 may be constructed of any of the variety of well-known filter materials such as charcoal-impregnated polyester or expanded aluminum, the former typically being used as an electrostatic filter to remove dust and other particulates from air drawn through the filter element and the latter typically being used to remove grease from air drawn through the filter element. A styrene plastic grid, not shown, is typically glued to a charcoal-impregnated polyester filter element for rigidity.

Range hood filter 20 further comprises a first, a second, a third, and a fourth non-telescoping frame member, 32, 34, 36, and 38, respectively, sequentially arranged to form a rectangle, wherein each said frame member constitutes a different side of said rectangle. First and third frame members 32, 36 are of substantially the same length and parallel to one another; second and fourth frame members 34, 38 are substantially the same length and parallel to one another and perpendicular to first and third frame members, 32 and 36.

Each frame member is substantially U-shaped in transverse cross-section, as shown in FIG. 4, preferably being formed from extruded poly-vinyl chloride (PVC) plastic, and has a longitudinal channel 40 formed by sidewalls 42 that extend in a substantially parallel manner from the edges of back 44 of frame members 32–38. Longitudinal channel 40 is seen to face inwardly into the rectangle formed by frame members 32–38, and first, second, and third sides, 24, 26, and 28, respectively, of filter element 22 are respectively inserted and fittingly received into channels 40 of first, second, and third frame members, 32, 34, and 36, respectively, as shown for example in FIG. 7. Fourth side 30 of filter element 22 is not inserted into channel 40 of fourth frame member 38.

Referring to FIGS. 2, 4, and 5, the corners formed by adjacent frame members are fixedly joined by attachment means 46, one for each corner, for a total of four. In the preferred embodiment, each frame member has a pair of flanges 48 extending inwardly toward each other into channel 40, one from each sidewall 42, to form opposing channels 50. In this preferred embodiment, attachment means 46 is a right-angled clip 52, preferably of resilient metal, whose ends 54 are inserted into channels 50 to form each corner. Clips 52 have left and right faces 56, at right angles to each other, each having an outwardly bent retaining tab 58, as shown, which retains clip 52 within channel 50 by deformably and frictionally pressing against the inner surface 60 of back 44 of the respective frame member.

Referring again to FIGS. 1, 2 and 3, range hood filter 20 also comprises a selectively trimmed plastic pane 62 for covering mouth M of cavity C, pane 62 being capable of passing illumination from light L therethrough. In the trade, a range hood filter's light pane is commonly known as a "light lens," whether or not (and typically not) it is formed as an actual lens. Pane 62 may be transparent or preferably translucent, and has, in clockwise sequence, a first, a second, a third, and a fourth side, 64, 66, 68, and 70, respectively. First, third, and fourth sides 64, 68, and 70, respectively, of pane 62 are respectively inserted and fittingly received into channels 40 of first, third, and fourth frame members 32, 36, and 38, respectively, as shown for example in FIG. 8. Second side 66 of pane 62 is not inserted into channel 40 of second frame member 34.

Referring to FIGS. 2, 3, and 6, range hood filter 20 also comprises means 72 for sealingly joining fourth side 30 of filter element 22 to second side 66 of pane 62. In the preferred embodiment, means 72 comprises a separator bar 74 having an "S"-shaped transverse cross-section. It shall be understood that the "S" shape of bar 74 shall also be considered to include the similar "Z" shape that bar 74 may have. Bar 74 has first and second longitudinal channels 76 and 78, respectively, facing in opposite directions and located on opposite sides of separator bar 74, with fourth side 30 of filter element 22 being inserted into first longitudinal channel 76 and with second side 66 of pane 62 being inserted into second longitudinal channel 78, and with one end 80 of bar 74 being inserted into longitudinal channel 40 of first frame member 32 and the other end 82 of bar 74 being inserted into longitudinal channel 40 of third frame member 36 in a manner that will now be apparent to those skilled in the art. The relative sizes of channels 76 and 78 may be chosen to fit the required thicknesses of filter element 22 and pane 62 in a manner well-known to those skilled in the art.

The user of the present invention would buy a kit of the various parts as shown in FIG. 2, and using trimming means such as scissors, trim frame members 32-38, pane 62 and filter element 22, as well as bar 74, to match the particular dimensions of range hood H. Clips 52 would then be used to join the elements of filter 20 together, and the filter would then be inserted under the range hood in a manner that will now be apparent.

Although the present invention has been described and illustrated with respect to a preferred embodiment and a preferred use therefor, it is not to be so limited since modifications and changes can be made therein which are within the full intended scope of the invention.

I claim:

1. A trimmable range hood filter for covering both an inlet opening of a range hood and a light on said range hood adjacent said inlet opening, said range hood filter comprising:
   (a) a rectangular filter element selectively trimmed to have compatible dimensions with said inlet opening, said filter element having, in clockwise sequence, a first, a second, a third, and a fourth side;
   (b) a first, a second, a third, and a fourth non-telescoping frame member sequentially arranged to form a rectangle, wherein each said frame member constitutes a different side of said rectangle, said first and said third frame members being of substantially the same length and being parallel to one another, and said second and said fourth frame members being of substantially the same length and being parallel to one another and perpendicular to said first and said third frame members, each said frame member having a longitudinal channel facing inwardly into said rectangle, with said first, second, and third sides of said filter element respectively being inserted into the longitudinal channels of said first, second, and third frame members but not that of said fourth frame member;
   (c) four attachment means, one at each corner of said rectangle, for fixedly joining adjacent frame members to form said each corner;
   (d) a selectively trimmed plastic pane capable of passing illumination from said light therethrough, said pane having, in clockwise sequence, a first, a second, a third, and a fourth side, with said first, third, and fourth sides of said pane respectively being inserted into the longitudinal channels of said first, third, and fourth frame members but not that of said second frame member; and
   (e) means for sealingly joining said fourth side of said filter element to said second side of said pane.

2. The trimmable range hood filter as recited in claim 1, in which said means for sealingly joining comprises a separator bar having first and second longitudinal channels facing in opposite directions and located on opposite sides of said separator bar, with said fourth side of said filter element being inserted into said first longitudinal channel of said separator bar and said second side of said pane being inserted into said second longitudinal channel of said separator bar, and with one end of said bar being inserted into the longitudinal channel of said first frame member and the other end of said bar being inserted into the longitudinal channel of said third frame member.

3. The trimmable range hood filter as recited in claim 2, in which said bar has an "S" shaped transverse cross-section.

4. The trimmable range hood filter as recited in claim 3, in which said pane is translucent.

* * * * *